(12) United States Patent
Rawdon

(10) Patent No.: US 8,780,174 B1
(45) Date of Patent: Jul. 15, 2014

(54) THREE-DIMENSIONAL VISION SYSTEM FOR DISPLAYING IMAGES TAKEN FROM A MOVING VEHICLE

(75) Inventor: Blaine K. Rawdon, San Pedro, CA (US)

(73) Assignee: The Boeing Company, Chicago, IL (US)

( * ) Notice: Subject to any disclaimer, the term of this patent is extended or adjusted under 35 U.S.C. 154(b) by 264 days.

(21) Appl. No.: 12/903,010

(22) Filed: Oct. 12, 2010

(51) Int. Cl.
*H04N 13/00* (2006.01)

(52) U.S. Cl.
USPC .......................................................... 348/43

(58) Field of Classification Search
None
See application file for complete search history.

(56) References Cited

U.S. PATENT DOCUMENTS

| | | | |
|---|---|---|---|
| 5,371,358 A * | 12/1994 | Chang et al. | 250/226 |
| 7,353,114 B1 | 4/2008 | Rohlf et al. | |
| 7,463,772 B1 | 12/2008 | Lefevere et al. | |
| 7,508,978 B1 | 3/2009 | Lefevere et al. | |
| 7,586,655 B1 | 9/2009 | Uhlik et al. | |
| 7,623,274 B1 | 11/2009 | Lefevere | |
| 7,660,458 B1 | 2/2010 | Saric | |
| 7,805,244 B2 * | 9/2010 | Park et al. | 701/501 |
| 8,106,936 B2 * | 1/2012 | Strzempko et al. | 348/36 |
| 2003/0164827 A1 | 9/2003 | Gottesman et al. | |
| 2004/0174453 A1 * | 9/2004 | Okada et al. | 348/333.06 |
| 2007/0097206 A1 * | 5/2007 | Houvener et al. | 348/26 |
| 2007/0188883 A1 | 8/2007 | Seo et al. | |
| 2008/0024484 A1 | 1/2008 | Naimark | |
| 2008/0033641 A1 | 2/2008 | Medalia | |
| 2008/0082549 A1 | 4/2008 | Baker et al. | |
| 2008/0291217 A1 | 11/2008 | Vincent et al. | |
| 2009/0046140 A1 * | 2/2009 | Lashmet et al. | 348/51 |
| 2009/0179895 A1 | 7/2009 | Zhu et al. | |
| 2009/0240431 A1 | 9/2009 | Chau et al. | |
| 2009/0256840 A1 | 10/2009 | Varadhan et al. | |
| 2009/0259976 A1 | 10/2009 | Varadhan et al. | |
| 2010/0045666 A1 | 2/2010 | Kornmann et al. | |
| 2010/0045667 A1 | 2/2010 | Kornmann et al. | |

(Continued)

FOREIGN PATENT DOCUMENTS

JP 08322066 A * 12/1996

OTHER PUBLICATIONS

Finch, WF; "Synthesis of Three Dimensional Image from a Moving Monocular Information Field" IBM TDB 11-80 p. 2391-2392 and IP.com Publication No. IPCOM000056234D electronically published on Feb. 14, 2005.*

(Continued)

*Primary Examiner* — Dave Czekaj
*Assistant Examiner* — Tyler W Sullivan
(74) *Attorney, Agent, or Firm* — Brook Assefa

(57) ABSTRACT

A three-dimensional vision system, device, and methods using the same are disclosed. The system or device includes an image device capable of capturing a plurality of sequential individual or scanned images of a field-of-view, a buffer that stores the images for a predetermined time delay, first and second image stabilizers coupled to the buffer, and a display. The predetermined time delay signals the buffer to transmit an older image and a newer image, sequentially separated in time by the predetermined time of the predetermined time delay. The display is coupled to the first and second image stabilizers to present the images to a viewer in a format that enables the viewer to see a three-dimensional image. At least one of the first and second image stabilizers adjust the orientation of either the older image or the newer image to correspond to the orientation of the other image.

20 Claims, 5 Drawing Sheets

(56) References Cited

U.S. PATENT DOCUMENTS

| | | | |
|---|---|---|---|
| 2010/0045703 A1 | 2/2010 | Kornmann et al. | |
| 2010/0053219 A1 | 3/2010 | Kornmann | |
| 2010/0067072 A1 | 3/2010 | Lefevere | |
| 2010/0086199 A1* | 4/2010 | Kim et al. | 348/51 |
| 2010/0177169 A1 | 7/2010 | Saric | |
| 2010/0215250 A1 | 8/2010 | Zhu | |
| 2010/0295927 A1* | 11/2010 | Turner et al. | 348/50 |

OTHER PUBLICATIONS

Albota, M.A. et al., "Three-Dimensional Imaging Laser Radars with Geiger-Mode Avalanche Photodiode Arrays," *Lincoln Laboratory Journal*, vol. 13, No. 2, pp. 351-370 (2002).

Giret, R. et al., "A Study of a 3D-SAR Concept for a Millimeter-Wave Imaging Radar onboard an UAV," European Radar Conference, Amsterdam (4 pages) (2004).

Hug, C. et al., "Detecting and Identifying Topographic Objects in Imaging Laser Altimeter Data," *IAPRS* vol. 32, Part 3-4W2, 3D Reconstruction and Modeling of Topographic Objects, Stuttgart, pp. 19-26 (Sep. 17-19, 1997).

Marino, R.M. et al., "High-resolution 3D imaging laser radar flight test experiments," *Proc. of SPIE*, 5791, pp. 138-151 (2005).

Overby, J. et al., "Automatic 3D Building Reconstruction From Airborne Laser Scanning and Cadastral Data Using Hough Transform," *International Archives of Photogrammetry, Remote Sensing and Spatial Information Sciences*, 34 (partB3), pp. 296-301 (2004).

Wagner, W. et al., "3D vegetation mapping using small-footprint full-waveform airborne laser scanners," *International Journal of Remote Sensing*, vol. 29, No. 5, pp. 1433-1452 (Mar. 2008).

* cited by examiner

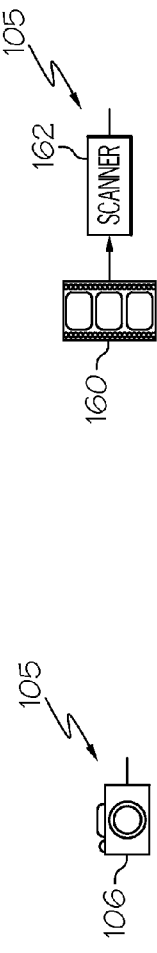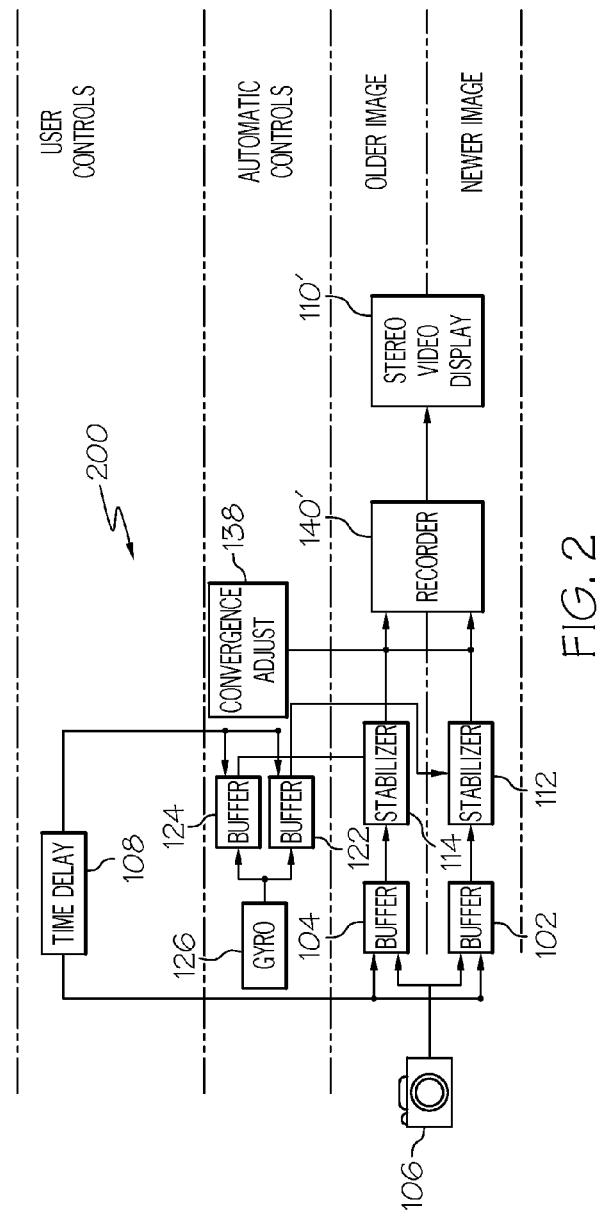

THREE-DIMENSIONAL VISION SYSTEM FOR DISPLAYING IMAGES TAKEN FROM A MOVING VEHICLE

FIELD

This application relates to three-dimensional vision systems using images, more particularly, the display of binocular (stereo) images taken from a moving vehicle, movie film or video recording in a format that enables viewing as a moving three-dimensional image.

BACKGROUND

Views from airliner windows tend to appear flattened (i.e., the view lacks binocular effect). The Rocky Mountains even appear modest in scale as seen from an airliner. This is because depth perception is lost primarily because of the distance to the ground. At night, it is even more difficult to see from an airliner window due to darkness. Current external camera views from airplanes suffer from the same flattened appearance due to monocular vision combined with reduced resolution compared to the naked eye and the distance to the ground.

Another type of view from an airplane is aerial photography for documenting geography. The view when documenting geography aerially is typically from directly overhead. Sometimes "stereo pairs" of images of a single area are made by taking photographs from different passes by the airplane over the same geography. The first pass might be an overhead image while the second pass is laterally offset from the first pass, providing an overlap for a portion of the initial image. This pair of images may be used later in a special viewer to enable a technician to discern the altitude of objects and the altitude contour lines of the terrain. Standard three-dimensional aerial photography techniques, such as the two pass approach just described, have a substantial time delay between the first and second shots of a subject. This means that the subject must be stationary for the three-dimensional representation to be accurate and there is no means during the flight or afterwards to adjust the interpupillary distance (except by adjustment of the second flight path).

Another type of view from an airplane is radar, such as military surveillance or "recreational" viewing of geography. Synthetic aperture radar is used in surveillance airplanes. This system records radar returned over a period of time corresponding to a spatial distance. This effectively increases the physical size of the radar antenna (its "aperture"), hence the name "synthetic aperture." The signals are highly processed to obtain the enhanced resolution that accompanies a larger aperture. However, radar produces a view of geography that is not natural to a typical viewer—it is not like a photograph at all nor is it a binocular view.

A different type of viewer is Google's "Google Maps," in particular its "Street View." Google Maps is a web-based application that provides a computer viewer with maps of the Earth in various overhead views. The Street View provides a melded, panoramic view of the geography from the street level, typically in 2-D, but with some available in three-dimensional. The three-dimensional images use red-cyan biased images that require viewing with red-cyan glasses. it is believed that these viewers may use a stereo-pair camera system. This type of system takes multiple still images from multiple cameras.

Existing stereo images are formed by the simultaneous use of two cameras, such as those filming techniques used for movies. The geometric distance between their lenses defines the three-dimensional effect that results. This distance is generally not adjustable and a relatively short maximum distance is constrained by physical considerations such as weight and bulk.

SUMMARY

In one aspect, three-dimensional vision systems are disclosed. In one embodiment, the three-dimensional vision system includes an image device capable of capturing a plurality of images of a field-of view comprised of sequential individual or scanned images, a buffer that stores the images therein for a predetermined time delay, wherein the predetermined time delay signals the buffer to transmit an older image and a newer image therefrom that are sequentially separated in time by the predetermined time of the predetermined time delay, a first image stabilizer coupled to the buffer, wherein the newer image is transmitted to the first image stabilizer, a second image stabilizer coupled to the buffer, wherein the older image is transmitted to the second image stabilizer, and at least one of the first and second image stabilizers are capable of adjusting the orientation of either the older image or the newer image to correspond to the orientation of the other image, and a display coupled to the first and second image stabilizers, wherein the display receives the older image and the newer image from the stabilizers post-adjustment and presents the older and newer images to a viewer in a format that enables the viewer to see a three-dimensional image of the field-of-view.

In another embodiment, the three-dimensional system may include an image device capable of capturing a plurality of sequential images over time, a processor configured to receive a plurality of sequential images from the image device and to adjust the orientation of at least one image relative to a second image that are separated in time from one another by a predetermined time delay. At least one image and the second image are recordable for later display or displayable in a format that enables a viewer to see a three-dimensional image.

In another aspect, a device is disclosed that includes an image device capable of capturing a plurality of sequential individual images of a field-of view, a buffer that stores the plurality of images therein for a predetermined time delay, wherein the predetermined time delay signals the buffer to transmit an older image and a newer image therefrom that are sequentially separated in time by a predetermined amount of time, a first image stabilizer coupled to the buffer, wherein the newer image is transmitted to the first image stabilizer, a second image stabilizer coupled to the buffer, wherein the older image is transmitted to the second image stabilizer, and at least one of the first and second image stabilizers are capable of adjusting the orientation of either the older image or the newer image to correspond to the orientation of the other image, and a display coupled to the first and second image stabilizers, wherein the display receives the older image and the newer image from the stabilizers post-adjustment and presents the older and newer images to a viewer in a format that enables the viewer to see a three-dimensional image of the field-of-view.

In another aspect, methods are disclosed that include storing a plurality of sequential images of a field-of-view in at least one buffer for a predetermined time delay, transmitting from the buffer to at least one image stabilizer an older image and a newer image that are separated from one another by the predetermined time delay, aligning the orientation of at least one of the older and newer images relative to the other, displaying or recording the older and newer images after aligning the orientation thereof.

The features, functions, and advantages that have been discussed can be achieved independently in various embodiments or may be combined in yet other embodiments, further details of which can be seen with reference to the following drawings and description.

BRIEF DESCRIPTION OF THE DRAWINGS

FIGS. 1A and 1B are illustrations of possible embodiments for the source of the images.

FIG. 2 is a block diagram of an embodiment of a three-dimensional vision system that includes a recorder.

DETAILED DESCRIPTION

Figure 1:
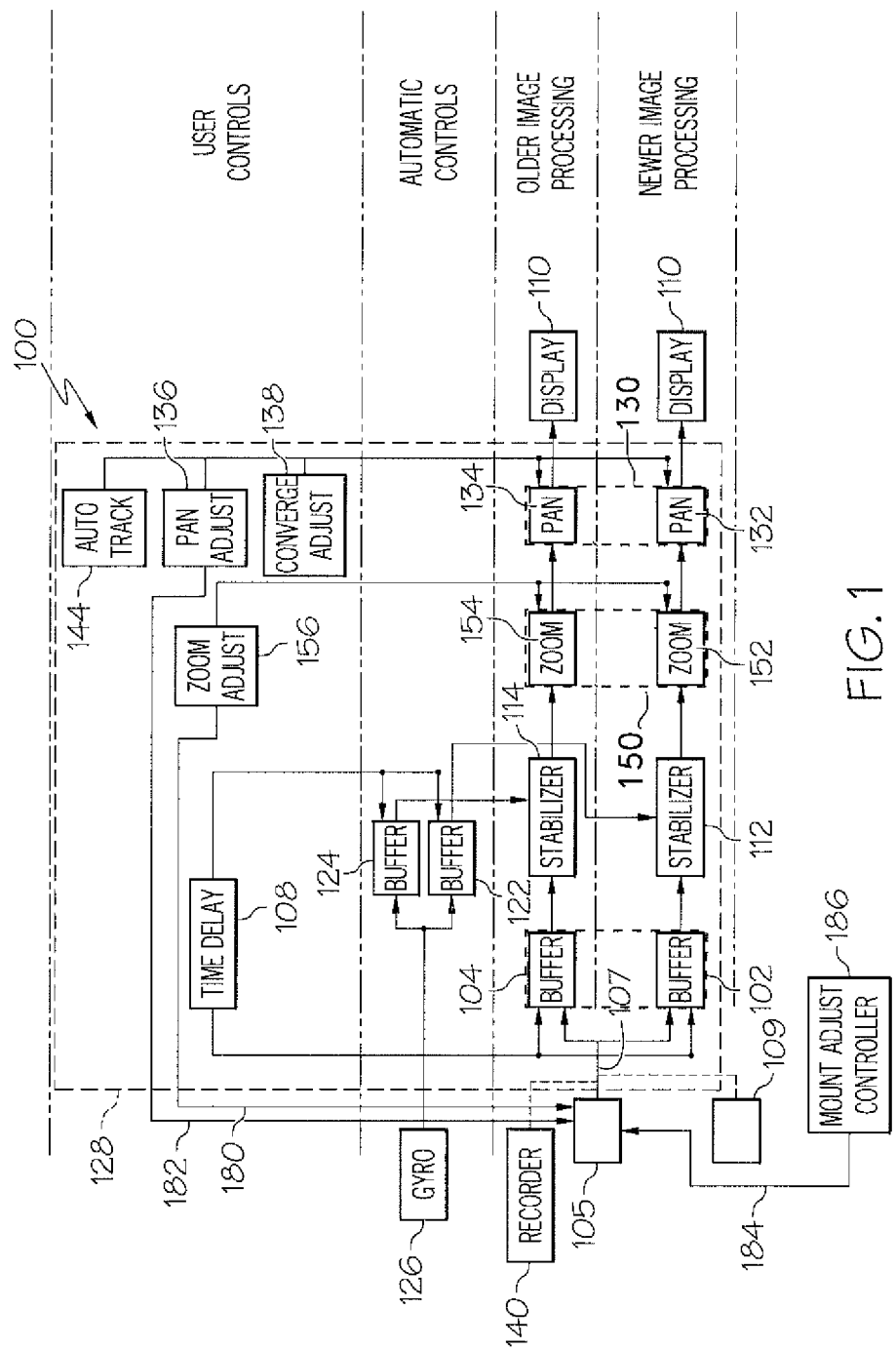
FIG. 1 is a block diagram of an embodiment of a three-dimensional vision system for displaying images for binocular vision of images taken from a moving vehicle.

The following detailed description will illustrate the general principles of the invention, examples of which are additionally illustrated in the accompanying drawings. In the drawings, like reference numbers indicate identical or functionally similar elements.

Referring now to FIG. 1, a three-dimensional vision system, generally designated 100, is illustrated that includes a source of a plurality of images of a field-of-view comprised of an image device 105 capable of capturing sequential individual or scanned images, a buffer device that may comprise one or more image buffers 102, 104, a gyroscope 126, gyroscope buffers 122, 124, an image stabilizer that may comprise one or more image stabilizers 112, 114, image processing means such as a pan processor 130 and a zoom processor 150 and a display 110. The three-dimensional system 100 may also include a time delay controller 108, zoom controller 156, a pan controller 136, a convergence controller or processor 138, an auto-tracking controller 144, and a recorder 140. This diagram is divided into four sections: Newer Image Processing; Older Image Processing; Automatic Controls; and User Controls. An actual embodiment may be executed in a different way and may be in a different order or may be processed more in parallel and less in series. The components of the three-dimensional vision system 100 may be part of a moving vehicle, whether connected thereto or built therein.

As shown in FIG. 1A, the image device 105 of FIG. 1 may be a camera 106. The camera 106 may include, alone or in combination, a digital camera, a phased array sensor, CCD or CMOS sensors, thermal imagers, infrared imagers such as an infrared camera, and/or a scanner. As shown in FIG. 1B, the scanned images may be the images from a motion picture 160 that are scanned by a scanner 162 and transmitted to the first and second image buffers 102, 104 (shown in FIG. 1).

The three-dimensional vision system 100 of FIG. 1 may provide a binocular effect using images from a camera 106, illustrated in FIG. 1A, including the ability to adjust the interpupillary distance between two images (a newer and an older image) that are displayed in a format that enables a viewer to see a three-dimensional image. The system 100 may have a user-adjustable binocular effect, including a user adjustable interpupillary distance. The interpupillary distance may be adjusted to large distances that exceed the length of the vehicle on which the camera is mounted. These features will be described in more detail below.

Figure 3:
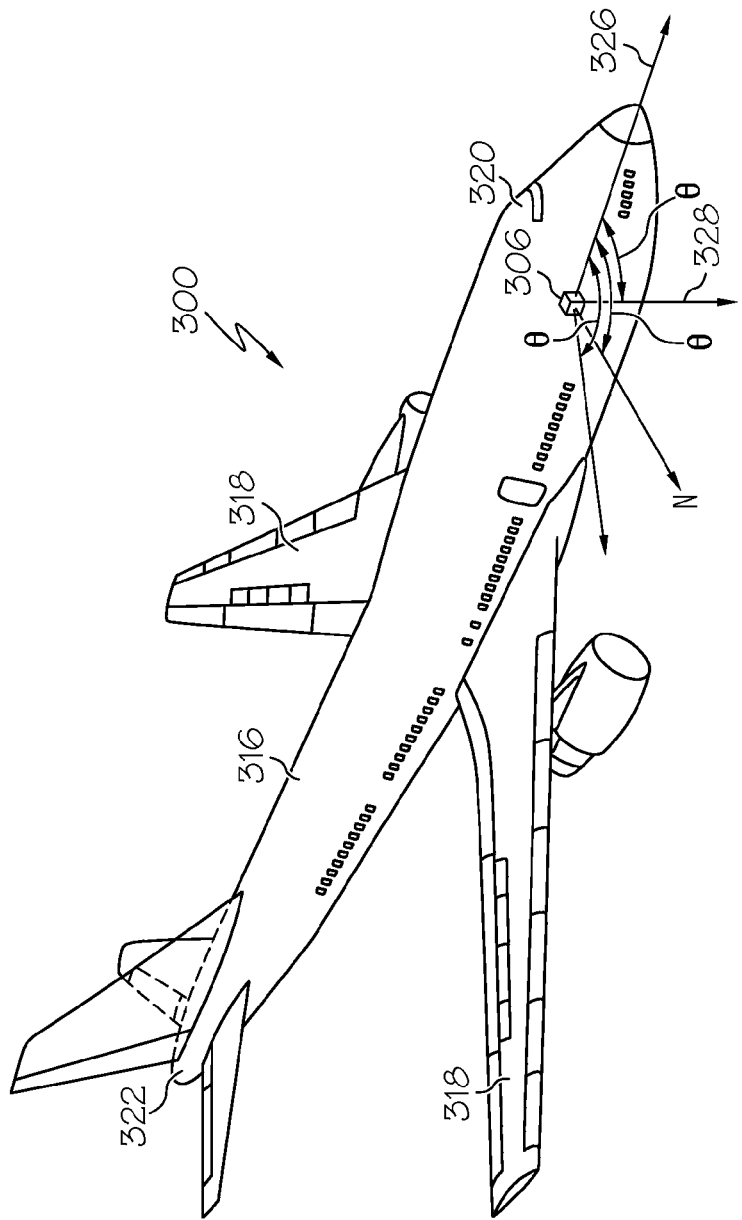
FIG. 3 is an illustration of an airplane having a side-looking camera mounted thereon for sending images to a three-dimensional vision system.

As indicated above, the end result of the three-dimensional vision system 100 is binocular vision provided from a single imaging device 105 as illustrated in FIG. 1. The imaging device 105 is generally oriented relative to the moving vehicle in a direction generally perpendicular to the direction of the motion of the moving vehicle. In the case of an airplane, designated 300 in FIG. 3, the imaging device, now designated 306, is pointed in a direction that is generally perpendicular 328 to the direction of the flight 326 of the airplane—to either side, up or down or combinations thereof. While airplane 300 is shown in FIG. 3, it is to be understood that the imaging device 105, which may be a camera 106, may be mounted in another vehicle, including satellites, guided and unguided rockets, trains, cars, and ships. In one embodiment, the lens of the imaging device may be positioned relative to the airplane flight path so that the camera is positioned at an angle θ between about 45° to about 135° and more preferably approximately 90° relative to the flight path.

Airplane 300 includes a fuselage 316 with wings 318 extending therefrom, a cockpit 320 at the head of the fuselage, and a tail 322. While an airplane is illustrated herein as the moving vehicle, application of the three-dimensional vision systems 100 is not limited thereto. This system is applicable to any moving vehicle, including, but not limited to trains, automobiles (including cars, trucks, busses, and the like), boats, heavy duty equipment, airplanes, helicopters, other airships, and satellites. The size of the moving vehicle on which the imaging device 105 is mounted may vary significantly as some of these vehicles may be unmanned and/or remote controlled. Furthermore, the airplane illustrated in FIG. 3 is merely one example of a moving vehicle that may incorporate the three-dimensional viewing system. In another embodiment, the airplane may not have a fuselage or windows within the body of the airplane aft of the flight deck. Various airplane body styles are known, for example, a blended wing body style such as the Boeing X-48 or a flying wing body style such as that of a stealth fighter. For some of the other vehicles, the image device 105 or camera 106 may be mounted with its lens substantially perpendicular to the forward direction or backward direction of the vehicle.

In one embodiment, the zoom controller 156 may be coupled to the imaging device 105 as shown by pathway 180 in FIG. 1 and the pan controller 136 may be coupled to the imaging device 105 as shown by pathway 182. Such a configuration may be advantageous in an unmanned vehicle. If the unmanned vehicle is being used for surveillance purposes, the remote operator of the vehicle may find it useful to be able to zoom and pan the camera itself to focus on a target of interest. The system may also include an adjustable camera mount 184 and a camera mount controller 186 to adjust the orientation of the camera (i.e., move the camera so it points more or less to the left, right, up, or down relative to its prior position). In another embodiment, the imaging device 106 may be gyro-stabilized to decouple the direction it is pointing from short term maneuvers, such as banking, similar to the manner in which TV cameras on helicopters are stabilized such that the view of the image is steady. Any of the features described above for imaging device 106 are also couplable to a second imaging device 109 to provide the same benefits.

As used herein, the word "coupled" or "couplable" includes direct or indirect connections between the components.

As used herein, the word "individual" in referring to "individual images" means a complete separate image formed across the imaging device or sensor over a common period of time. This includes individual frames of a motion picture, "scanned" images such as those made by a scanner and/or some types of video cameras, sequential photographs or digital images from a camera or other imaging device.

In one embodiment, a plurality of imaging devices may be used to supply the signal to the rest of system 100. For example, there may be four imaging devices (the same or different) each respectively positioned generally perpendicular to the flight path, but looking at a different field-of-view relative to the moving vehicle. The first imaging device may be looking to the left of the moving vehicle. The second imaging device may be looking to the right of the moving vehicle. The third and forth imaging devices, respectively, may be positioned with one looking up and the other looking down relative to the moving vehicle. The three-dimensional vision system 100 may include a controller that allows the user to switch between the plurality of imaging devices so the user can see a different field-of-view. In another embodiment, there may be a plurality of imaging devices oriented such that their images can be linked to form a panorama that may be wider in field-of-view and/or greater in resolution than an image from a similar single imaging device.

In another embodiment, the second image device 109 (see FIG. 1) may be a night vision camera. Accordingly, image device 105 may be suitable for daytime images while the second camera 109 may be suitable for night or low light images. The second imaging device 109 may be an infrared camera. In one embodiment, the signals from the day and night cameras 105, 109 may enter the three-dimensional vision system sequentially at different time intervals. In another embodiment, the signals of the day and night cameras 105, 109 may be combined and enter the three-dimensional vision system as one image, or may be combined after entering the system. In any of the above embodiments having a plurality of cameras, a selection switch (not shown) may be included that only allows one camera signal to enter the three-dimensional vision system 100 at a time. The daytime image device may operate using visible light, but is not limited thereto. The night image device may operate on infrared, but is not limited thereto. In another embodiment, the first and the second image devices 105, 109 may capture or be sensitive to other kinds of electromagnetic radiation to form the images, for example, gamma rays, X rays, radio waves, etc. In another embodiment, one or both of the image devices 105, 109 may produce an image from an acoustic signal, which may be applicable for ships, submarines and other marine vessels.

The signals (i.e., images of the field-of-view) from image device 105 or from both image devices 105, 109 (or from optional recorder 140 if playback is delayed), taken while the vehicle is moving, enter the three-dimensional vision system 100 where they may be stored in a first image buffer 102 and a second image buffer 104. Each buffer 102, 104 stores the signal for some period of time, which may be adjustable, and then passes the signal on to image stabilizers 112, 114. The period of time for which the images are stored in the two buffers 102, 104 is controlled by the time delay input controller 108. It may be that the time delay for the first image buffer 102 is set to zero (direct pass-through) or some constant small period. In this case, the time delay input controller 108 drives only the second image buffer's 104 time delay. The buffers 102, 104 may be designated "left" and "right" corresponding to their respective signals' delivery to left and right displays. Alternately, rather than demonstrating these as "left" and "right," the designation of "newer" and "older" images may be more useful. The newer image is the one from the first image buffer 102 since its time delay is the shortest and the older image is the one from the second image buffer 104 since its time delay is the longest. It is understood that it is possible to set the first image buffer 102 to have the longer time delay and the older image buffer 104 to have the shorter time delay.

The time delay input controller 108 may be adjustable (e.g., by a program within processor 128) or may be user-adjustable. A change in the time delay using the time delay input controller 108 can increase or decrease the time between the newer and older images being transmitted to the first and second image stabilizers 112, 114, respectively. Due to the velocity of the moving vehicle, the change in time between images is a change in distance between them as well. The appearance of depth of distant objects may be enhanced by the use of a greater geometric separation between the two viewpoints. So, the ability to adjust the geometric separation between viewpoints by adjusting the time delay between images provides the ability to adjust the sensation of three-dimensional depth perception. A user-adjustable time delay input controller 108 would allow the user to adjust the sensation of three-dimensional depth perception in real time.

Each image stabilizer 112, 114 includes an image processor that may pan the image laterally or vertically. The stabilizers 112, 114 may also both be able to rotate the image about a specified point. The degree to which the image is panned or rotated depends on the signal (i.e., data) that ultimately comes from the gyroscope 126, which is explained in more detail below. There are at least two generally intended results: 1) reduce higher frequency motion of the image commonly referred to as jitter or shake; and 2) align the old and new images to account for changes in the vehicle's attitude (pitch, roll, and yaw when it is an aircraft) during the period between the old image and the new image. These adjustments provide the advantage of making the images easier for the viewer to fuse them into one three-dimensional image.

Mechanisms to perform image stabilization to reduce the higher frequency motion (i.e., jitters or shake) are well developed in present digital camera and signal processing technology. For instance, video processing software is able to stabilize the image of a shaky video without any data about the camera's movement other than the image itself. Such video processing software or similar software may be included in the processor 128 or within the first and second image stabilizers 112, 114. The newer and older images are automatically aligned or adjusted by the image stabilizers 112, 114 to account for these types of changes in the motion of the vehicle.

The alignment or adjustment of the orientation of the old and new images to account for changes in the vehicle's attitude (pitch, roll, and yaw when it is an aircraft) during the period between the old image and the new image are performed by the first and second stabilizers 112, 114 in conjunction with data provided by the gyroscope 126. The gyroscope buffers 122, 124 store data collected by a gyroscope 126 or other sensor. The storage of the data may be controlled by the time delay input controller 108 so that the data of the gyroscope collected at the time a particular image was captured can later be retrieved and processed in coordination with the image it was collected relative to. The gyroscope may collect angular motion data about the movement of the vehicle. When the vehicle is an airplane or other aircraft or spacecraft, the angular motion data may include the pitch, roll, and yaw thereof. Each gyroscope buffer 122, 124 receives the same data from the gyroscope 126, stores the data for the period of time designated by the time delay input controller 108, and then passes the signal on to image stabilizers 112, 114. The time delay for the first gyroscope buffer 122 and the first image buffer 102 should be the same or approximately the same since they will both transfer information to the first image stabilizer 112. The time delay for the second gyroscope buffer 124 and the second image buffer 104 should be the same or approximately the same since they will both transfer information to the second image stabilizer 114.

A processor 128 is coupled to or includes many of the components of the system, such as the first and second buffers 102, 104, the first and second gyroscope buffers 122, 124, and the first and second stabilizers 112, 114. The processor 128 receives the data from the first and second gyroscope buffers 122, 124 relative to the predetermined time delay and determines or calculates any change in the data and transmits the change to one or more of the first and second stabilizers 112, 114 where the lateral offset and/or vertical offset, for example, may be calculated as described below. Alternately, the processor 128 may calculate the change in the data from the gyroscope 126 and the lateral offset and/or vertical offset, etc. and thereafter transmits only the resulting degree of rotation (i.e., the amount the position of the vehicle moved during the predetermined time delay relative to a particular axis, such as the x, y, or z axis) to the first and second stabilizers 112, 114 for use in adjusting at least one of the older and newer images.

In one embodiment, for image alignment, the older (more delayed) image is adjusted so that it aligns properly with the newer (less delayed) image, accounting for the vehicle's angular motion in the time period between acquisition of the first and second images. This may be accomplished using the following equations and a few express assumptions. The calculations below are just one possible way to calculate the adjustment needed to align the older and newer images when the moving vehicle is an airplane. Herein, it is assumed that the image sensor is planar and that the lens is ordinary in the sense that it provides a square image of a square subject—it is not a fisheye or anamorphic lens, for instance. Also, the simplifying assumption is made that the camera is oriented so that it looks directly out the side of the vehicle—it is aligned with the airplane's axes. Furthermore, it is assumed that the camera is looking to the left. Some of the signs flip when looking to the right.

Rotation of the image due to aircraft pitch:

$$Q = \Delta P \qquad (1)$$

where Q is image rotation about the image center, in degrees; and $\Delta P$ is the change in the pitch, $\Delta P = P_1 - P_2$ where $P_1$ is the pitch at $T_1$ (the present time plus any delay for the first image buffer 102) and $P_2$ is the pitch at $T_2$ (the present time plus any delay for the second image buffer 104). Looking to the left relative to the vehicle's motion path provides a positive pitch rate that results in a positive value of Q, where positive is counter-clockwise. Looking to the right relative to the vehicle's motion path (again with a positive pitch rate) Q is negative.

Lateral offset:

$$X = 0.5 * TAN(\Delta B)/TAN(W/2) \qquad (2)$$

where X is the lateral offset in degrees; $\Delta B$ is the change in yaw angle, $\Delta B = B_1 - B_2$, where $B_1$ is the yaw angle at $T_1$ and $B_2$ is the yaw angle at $T_2$; and W is the camera's field-of-view across the width of the sensor, in degrees, which is defined as 1.000 units (linear dimension).

Vertical offset:

$$Y = 0.5 * TAN(\Delta R)/TAN(W/2) \qquad (3)$$

where Y is the lateral offset; $\Delta R$ is the change in the roll angle, $\Delta R = R_1 - R_2$, where $R_1$ is the roll angle at $T_1$ and $R_2$ is the roll angle at $T_2$; and W is the camera's field-of-view across the width of the sensor, in degrees, which is defined as 1.000 units (linear dimension).

These equations for lateral and vertical offset are but one version that may work. Others equations may provide approximately the same results. A more complex algorithm could be applied that accounts not just for the lateral or vertical shift of the image but also for a change in perspective. For instance, this can be done using processing software similar to that available in Adobe® Photoshop® imaging processing software.

Once the newer and older images are aligned or adjusted by the first and second image stabilizers 112, 114, the images may be manipulated by the zoom processor 150 and/or the pan processor 130. The zoom processor 150 may include a first zoom processor 152 for zooming in or out on the newer image and a second zoom processor 154 for zooming in or out on the older image. Similarly, the pan processor 130 may include a first pan processor 132 for panning the newer image and a second pan processor 134 for panning the older image. Both the zooming processor 150 and the panning processor 130 may have a controller for adjusting the zooming and panning features, i.e., zoom controller 156 and a pan controller 136 shown in FIG. 1. The zoom controller 156, when adjusted, transfers an adjustment signal to both the first and second zoom processors 152, 154 for equal adjustment to both the newer and older images. Similarly, when the pan controller 136 is adjusted an adjustment signal is transferred to both the first and second pan processors 132, 134 for equal adjustment to both the newer and older images. These controllers 156, 136 may be operated by the user to magnify and/or crop the combined images.

In one embodiment, zooming is accomplished by re-mapping image pixels. Zooming may be enhanced if the camera image has greater resolution than the display so that the display may be zoomed by a useful factor. The present ratio between high-end consumer digital camera sensors and a high-definition video display permits a zoom ratio of about three to one.

Panning may include moving the combined images horizontally and/or vertically within the "image frame" of the display. The "image frame" defines the image passed on to the image displays. Within the constraint of the overall image border, a zoomed image may be panned horizontally and vertically. As shown in FIG. 1, the first pan processor 132 receives a signal from the first zoom processor 152 and the second pan processor 134 receives a signal from the second zoom processor 154. It may be advantageous for the images coming to the pan processors 132, 134 to be slightly larger than the image frame so that there is some room for pan adjustment. Mechanisms to perform both the zooming and the panning are well developed in present digital camera and signal processing technology. For instance, Adobe® Photoshop® image processing software provides a means to zoom, pan and rotate and image that may be applicable here.

In one embodiment, the pan processors 132, 134 move the image frame vertically and horizontally according to inputs from the convergence controller 138, a pan adjustment controller 136, and an auto-tracking system and controller 144. The pan adjustment was discussed above. Now turning to the convergence controller 138, this controller provides adjustment to the alignment of the older and newer images to account for the linear motion of the moving vehicle. In one embodiment, the convergence controller 138 is adjustable by the user or by the processor 128. This controller allows adjustments based on what object is of interest in the field-of-view. For example, if a viewer is looking out a window of the moving vehicle and sees the moon, a mountain, and clouds, wherein the moon is the furthest away and the clouds are the closest, as the vehicle moves forward. If the convergence controller is set to zero (for example), then the moon appears in the same location in the older and newer images, but the mountains will appear to be separated by a little bit and the clouds will have moved more significantly. This separation in the images is a result of the camera's location relative to its distance from the respective objects. The convergence controller 138 aligns the older and newer images so that the clouds (for example) are no longer separated by the gap created from the vehicle moving forward. In the example, the moon would require no adjustment, the mountains a small adjustment, and the clouds a larger adjustment. One way to think of convergence adjustment is as an adjustment of the degree of "crossed eyes" in binocular vision. A close convergence distance implies very crossed eyes. A far convergence distance implies nearly parallel eyes.

The convergence controller 138 may drive the pan processor 130 to make a relatively small horizontal adjustment of the newer and older image frames in opposite directions to align objects at a desired distance from the camera so that they appear at the same location on the newer and older image displays. A change in adjustment results in a change in the alignment (or "convergence") distance.

In one embodiment, the following equations may be used to determine how the second image may be shifted laterally to align the image at the desired convergence distance.

$$ID = Vt \quad (4)$$

where ID is the interpupillary distance in feet (i.e., the distance between to viewing points represented by a newer image and an older image); V is the vehicle speed in feet per second; and t is the time delay difference between the first image buffer and the second image buffer.

$$X_C = 0.5 * (ID/CD)/\text{TAN}(W/2) * Z \quad (5)$$

where $X_c$ is the sum of the shift of the older and newer images as a fraction of the width of the display; ID is the interpupillary distance; CD is the desired convergence distance in the same units as ID; W is the camera's field-of-view across the width of the sensor, in degrees; and Z is the zoom factor if this correction is applied after the image is zoomed as illustrated in FIG. 1. The shifts of the older and newer images are in opposite directions so $X_c$ is the sum of the magnitude of these shifts.

The auto-tracking system and controller 144, when present, allows a selected object or portion of the image to be automatically tracked using the panning controller 130. Selection of the object and initiation of the automatic tracking function may be controlled by the user. In one embodiment, the panning processor 130 centers the image about the selected object or portion and maintains it at the center of the image as long as possible even though the vehicle is moving with respect thereto.

The processing of the newer and older images after being aligned with one another by the first and second image stabilizers 112, 114 (i.e., post-processing such as zooming, panning, convergence adjust, and auto track) may be done centrally or locally. When done centrally, the same post-processed image pair prepared by the central processor 128 is sent to each display 110. The components of the system may be directly or indirectly coupled to the display 110. In one embodiment, an indirect coupling may include a wireless transmission from the system to the display 110. In one embodiment, the wireless transmission may be a radio signal. For example, an airplane may include a plurality of displays 110 such as one per passenger. The processed images can then be transmitted broadly to users with no or limited post-processing capability at the display 110. When done locally, each display processes a single incoming image stream into a stereo pair and has the zooming, panning, convergence, and auto tracking features built in for manipulation of the image by individual users.

In an airplane, the plurality of displays 110 may be in the seat back in front of each passenger, may take the place of the windows of the airplane, may be hand held units, or glasses with the displays built-in as the lenses. In one embodiment, the glasses (i.e., a head-mounted stereo viewer) may display images processed centrally such that the display remains fixed with respect to the wearer even if the wearer turns his head. In another embodiment, the glasses may be equipped with post-processing equipment. The glasses may include a gyroscope that senses head motion and uses this signal to control the pan motion of the stereo image. In this way, the operator can look at different parts of the image in a natural way. In one embodiment, this control would be sensitive to the image angular field-of-view so that one degree of head motion can move the image one degree in angle also. The panning can occur laterally and vertically. An additional refinement would be to incorporate a rotation sensor so that if the viewer tilts his head sideways the view also rotates.

In one embodiment of a local post-processing, the display 110 may be a computer with a three-dimensional display. In this case, the user is able to make all of the adjustments noted above. It is possible to view moving images at speeds in which time passes more quickly (increased speed) or passes more slowly (slow motion). Increased-speed display requires that the image stream is pre-recorded and that the viewer can control the playback of this recording. The source of the single image stream may be: a feed from a central source such as a broadcast from a hard drive; a locally-mounted optical disk such as a DVD or Blue-Ray® disk; a locally-mounted hard drive or the like. The source may also be the two image buffers 102, 104. The image stream may also be played in slow motion. This may be done from the two image buffers 102, 104; a feed from a central source such as a broadcast from a hard drive; a locally-mounted optical disk such as a DVD or Blue-Ray® disk; or a locally mounted hard drive. When the images entering the buffers 102, 104 come from a storage source, the images still enter as individual frames sent to both buffers where the images are time-delayed and thereafter stabilized and aligned as described above.

In an embodiment comprising an unmanned vehicle, the images may be transmitted from the vehicle to a ground station comprising a display 110. The images may be transmitted in real-time via a wireless connection to the ground station. The ground station may also include the components of the three-dimensional vision system 100 that stabilize and align the images, (i.e., the first and second buffers 102, 104, the time delay controller 108, the gyroscope buffers 122, 124, the stabilizers 112, 114, and the convergence adjust controller 138). The ground station may also include the zoom controller 156, panning controller 136, and an auto-tracking controller 144. In another embodiment, the unmanned vehicle may include the stabilization and alignment components of the three-dimensional vision system 100. As such, the three-dimensional vision system 100 can transmit two video streams of images from the three-dimensional vision system 100 to the ground station that include the older and newer image displays 110.

As shown in FIG. 1, the three-dimensional vision system 100 may include a recorder 140 upstream from the first and second image buffers 102, 104. The recorder 140 may have stored images from the imaging device 106 mounted on the moving vehicle that it sends to the first and second image buffers 102, 104. The recorder 140 is an image recording system such as a magnetic hard drive, tape drive, disk drive, flash memory or other data storage device.

Now turning to FIG. 2, a diagram of another embodiment of a three-dimensional vision system, generally designated 200, is illustrated. This three-dimensional vision system 200 includes a imaging device 106, first and second image buffers 102, 104, first and second image stabilizers 112, 114, a gyroscope 126, first and second gyroscope buffers 122, 124, a time delay controller 108, a convergence adjust controller 138, a recorder 140', and a stereo video display 110'. The components having the same reference number may be as described above. The primary difference from the three-dimensional vision system 100 illustrated in FIG. 1 is the placement of the recorder 140'. The recorder 140' is downstream of the first and second image buffers 102, 104 and the first and second image stabilizers 112, 114, but upstream of the display 110'. The recorder 140' includes a first channel for recording the newer image and a second channel for recording the older image. These images may be sent to the display 110' in real time or as requested. The recorder 140' may be similar to the recorder 140 described above.

The displays 110, 110' may be any type of display capable of displaying the newer and older images in a format that allows the user to see a three-dimensional image of the field-of view. The three-dimensional vision systems 100, 200 ultimately take non-three-dimensional images from a camera that were acquired from a moving vehicle, as described above, and present the images as a binocular (stereo) image on the displays 110, 110'. The sensation of three-dimensional depth perception is the result of binocular vision. The displays 110, 110' may display the newer and older aligned images as a moving stereo image or as one or more stereo still images.

In one embodiment, the moving vehicle does not include windows for passengers, such as an airplane having no windows. Instead, the passengers have access to a display 110 displaying the newer and older images in a format that enables them to see a three-dimensional image of the geography and sky surrounding the airplane. In a windowless airplane, the display should provide a compelling synthetic (camera) view of what the passengers would have seen from the airplane if it had windows. The newer and older images displayed on the displays 110, 110' may be in real time or at any later time using the recorders 140, 140'. In one embodiment, the speed at which the image stream is displayed is adjustable such that the images may be displayed as still images, or in slow motion, normal speed, or increased speed.

Displays 110, 110' may be a three-dimensional TV, a three-dimensional monitor, a monitor adapted to three-dimensional with an overlay, a projector adapted to three-dimensional, a head-mounted display, or a stereo viewer. Some of these displays may require the user to wear special glasses to see the three-dimensional image. These displays may provide the newer and older images simultaneously to one display while the special glasses discriminate between the newer and older images such that the images are received by different eyes of the viewer. In one embodiment, the special glasses include polarized lenses that perform the discrimination. In another embodiment, the special glasses may include shutters that perform the discrimination, in essence turning the left and right eye lenses on and off alternatingly. In another embodiment, the display is a three-dimensional TV or monitor that can sequentially alternate between the newer and older images at a frequency high enough that the viewer doesn't perceive the alternation of the images with the naked eye, but using special glasses can see a three-dimensional image.

The three-dimensional vision systems disclosed herein, advantageously provide a lighter, more compact viewing system, permit mounting of a single camera at an optimal location with respect to the moving vehicle (such as an airplane), permit optimal adjustment according to the viewing distance and other factors, provide enhanced binocular vision effect, adjustable binocular vision effect, adjustable magnification, image stabilization, automatic tracking, and may include enhanced night vision relative to the naked eye.

Figure 4:
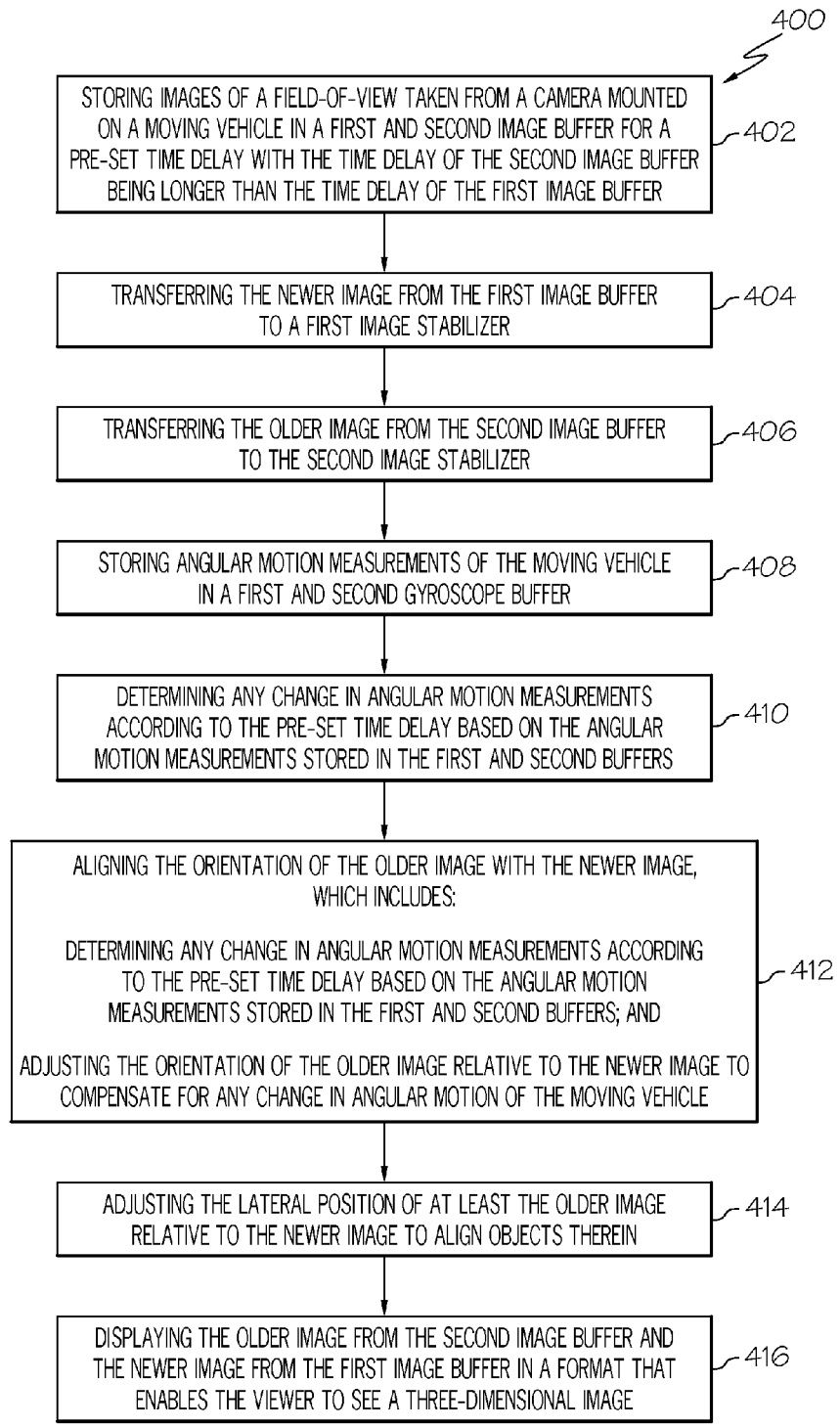
FIG. 4 is a graphical representation of a method of providing stereo images to a display from images gathered from a side-looking camera mounted on a moving vehicle.

Now referring to FIG. 4, the three-dimensional vision systems disclosed herein may be used in a method, generally designated 400, for presenting 2-D images from a camera for visualization by a user as a three-dimensional image. The method 400 may include the step 402 of storing images of a field-of-view taken from a camera mounted on a moving vehicle in a first and second image buffer for a predetermined time delay with the time delay of the second image buffer being longer than the time delay of the first image buffer, the step 404 of transferring the newer image from the first image buffer to a first image stabilizer, the step 406 of transferring the older image from the second image buffer to the second image stabilizer, the step 408 of storing angular motion measurements of the moving vehicle in a first and second gyroscope buffer, the step 410 of determining any change in angular motion measurements according to the predetermined time delay based on the angular motion measurements stored in the first and second buffers, the step 412 of aligning the orientation of the older image with the newer image, which includes: determining any change in angular motion measurements according to the predetermined time delay based on the angular motion measurements stored in the first and second buffers; and adjusting the orientation of the older image relative to the newer image to compensate for any change in angular motion of the moving vehicle, the step 414 of adjusting the lateral position of the older image relative to the newer image, the newer image relative to the older image, or both the older and newer images relative to each other to align objects therein, and the step 416 of displaying the older image from the second image buffer and the newer image from the first image buffer in a format that enables the viewer to see a three-dimensional image.

Figure 5:
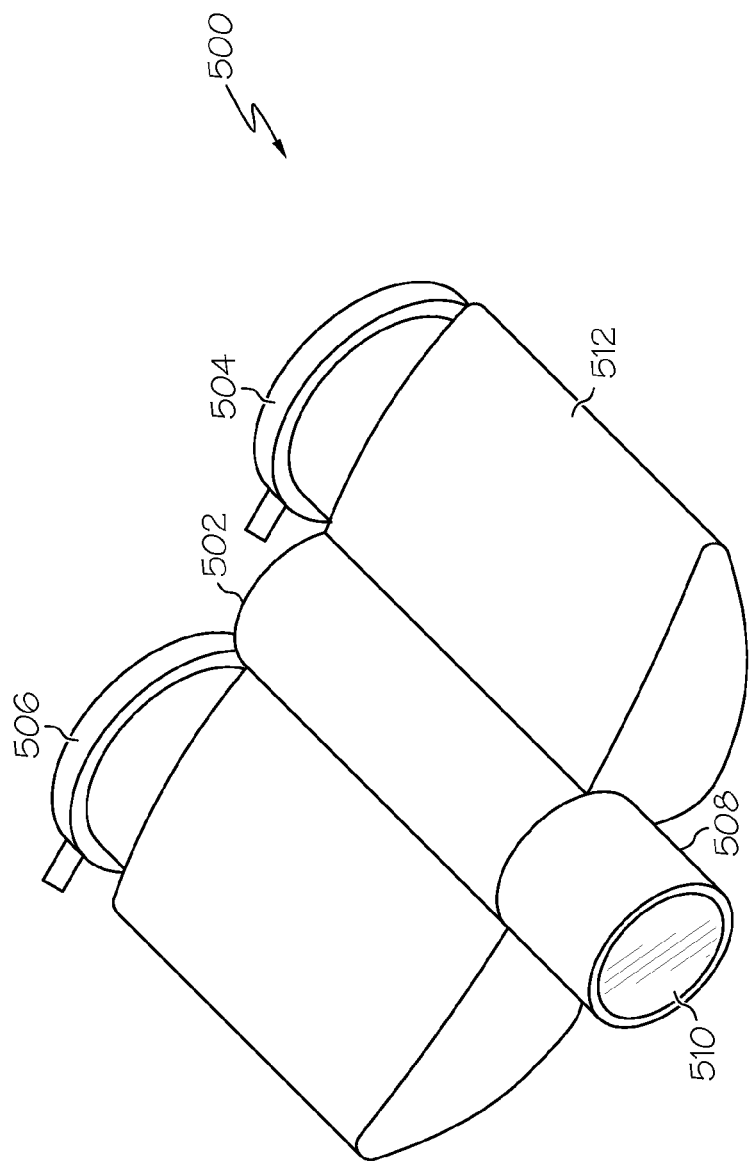
FIG. 5 is a side perspective view of an embodiment of a three-dimensional vision system housed in a portable unit.

The majority of the embodiments herein have been described relative to a moving vehicle such as an airplane. However, in an alternate embodiment, the moving vehicle could be a person holding or having connected thereto a portable device 500 (as illustrated in FIG. 5) that houses the components of one of the three-dimensional vision systems 100 or 200 described herein. The portable device 500 may resemble binoculars on a first end 502 comprising a first and a second display 504, 506 (that may both be adjustable and/or include the controllers such as the zoom controller 156, the pan controller 136, the convergence controller 138, and an auto-tracking feature 144). The portable device 500 also includes a camera or a sensor 510 at the second end 508 and a housing 512 between the first and second ends 502, 508 that houses the electronic components of the three-dimensional vision system. In one embodiment, the housing 512 may house the first and second image buffers 102, 104, the gyroscope 126, the first and second gyroscope buffers 122, 124, the time delay controller 108, the first and second stabilizers 112, 114, the first and second zoom processors 152, 154, the first and second pan processors 132, 134, the convergence controller 138, and any desirable controllers to operate the zoom, pan, and time delay. The images taken by the camera or sensor 510 are sent to the first and second image buffers 102, 104 and from there are processed as described above. The three-dimensional vision system ultimately sends a newer image to either the first or the second display 504, 506 and sends an older image to the other display so that the older and newer images presented to a viewer in a format that allows the viewer to see the older and newer images as a three-dimensional image. The portable device 500 may also include a recorder for later playback and viewing.

The embodiments of this invention described in detail and by reference to specific exemplary embodiments of the three-dimensional vision system are within the scope of the appended claims. It is contemplated that numerous other modifications and variations of the three-dimensional vision system may be created taking advantage of the disclosed approach. In short, it is the applicant's intention that the scope of the patent issuing herefrom be limited only by the scope of the appended claims.

What is claimed is:

1. A three-dimensional vision system comprising:
   a single image device configured to capture a plurality of images of a field-of view comprised of individual or scanned images temporally separated from one another by a preselected time period while the image device is moved with a velocity;
   wherein the plurality of images of the field-of view are taken from a moving vehicle having a gyroscope;
   a buffer that stores the images therein, wherein a first time signal having a first time period signals the buffer to transmit a newer image therefrom and a second time signal having a second time period that is longer than the first time period signals the buffer to transmit an older image therefrom that are sequentially separated in time by a time difference of the second time signal from the first time signal;
   a display coupled to the buffer, wherein the display receives the older image and the newer image and presents the older and newer images in a binocular format to a viewer that enables the viewer to see a three-dimensional image of the field-of-view;
   wherein the time difference is set relative to a selected interpupillary distance between the older image and the new image for the binocular format; and
   a user-adjustable input controller in communication with at least the second time signal to adjust the time difference thereby adjusting the sensation of three-dimensional depth perception;
   a first gyroscope buffer and a second gyroscope buffer coupled to the gyroscope, wherein the first and second gyroscope buffers both receive and store the same data characteristic of the orientation of the moving vehicle from the gyroscope, the data corresponding in time to the generation of the images of the field-of-view;
      a first image stabilizer coupled to the buffer, wherein the newer image is transmitted to the first image stabilizer; and
   a second image stabilizer coupled to the buffer, wherein the older image is transmitted to the second image stabilizer, and at least one of the first and second image stabilizers adjusts the orientation of either the older image or the newer image to correspond to the orientation of the other image; and
   wherein the first and second gyroscope buffers and the first and second image stabilizers are included in or are connected to a processor, wherein the processor receives data from the first gyroscope buffer that corresponds in time to the first time signal and receives data from the second gyroscope buffer that corresponds in time to the second time signal and determines any change in the data during the time difference and transmits the change to one or more of the first and second image stabilizers; and
      wherein at least one of the first and second image stabilizers receives the change in the data for adjusting the orientation of either the older image or the newer image; and thereafter sends the older image and the newer image, post-adjustment, to the display.

2. The system of claim 1, wherein at least one of the first and second image stabilizers adjusts at least one of the older and newer images to compensate for higher frequency angular motions of the moving vehicle.

3. The system of claim 1, wherein the moving vehicle is an aircraft and the data from the gyroscope includes pitch, roll and yaw thereof.

4. The system of claim 1, further comprising an image recorder upstream of the buffer and coupled thereto.

5. The system of claim 1, further comprising an image recorder downstream from the first and second image stabilizers but upstream of the display, the image recorder having a first channel for recording the newer image and a second channel for recording the older image.

6. The system of claim 5, wherein the display includes a stereo video display.

7. The system of claim 1, wherein the imaging device is a camera or sensor mounted on a vehicle.

8. The system of claim 7, wherein the camera or sensor collects images of the field-of-view that are generally perpendicular to the forward or backward direction of movement of the vehicle.

9. The system of claim 1, further comprising a pan processor coupled between the first and second image stabilizers and the display, a zoom processor coupled between the first and second image stabilizers and the display, and a zoom controller coupled to the zoom processor and a pan controller coupled to the pan processor.

10. The system of claim 9, further comprising a convergence controller coupled to the pan processor, wherein the convergence controller adjusts the lateral position of either one or both of the older image and the newer image relative to each other.

11. The system of claim 10, wherein the convergence controller adjusts the lateral position of the older image and the newer image in opposite directions.

12. The system of claim 1, wherein the image device is a scanner capable of scanning that scans a motion picture into sequential scanned images.

13. The system of claim 1, wherein the system is contained within a housing connectable to a user or hand-holdable by the user to move with the user.

14. The system of claim 1, wherein the buffer includes a first buffer portion that stores the images therein and a second buffer portion that stores the images therein also, and wherein the first time signal signals the first buffer portion to transmit the older image and the second time signal signals the second buffer portion to transmit the newer image therefrom.

15. The system of claim 1, wherein the orientation adjustment includes alignment of the older image and the newer image to account for the angular motion of the image device.

16. The system of claim 1, wherein the single imaging device is mounted to the moving vehicle, and the time difference is set relative to an interpupillary distance that exceeds the length of the moving vehicle upon which the single imaging device is mounted.

17. A portable device connectable to a user or hand-holdable by a user to move with the user, the portable device comprising:
  a housing enclosing components of a three-dimensional vision system, the three-dimensional vision system comprising:
  a single image device configured to capture a plurality of sequential individual images of a field-of-view that are temporally separated from one another by a preselected time period while the image device is moved with a velocity;
  a buffer that stores the plurality of images, wherein a time delay signal instructs the buffer to transmit an older image and a newer image therefrom that are sequentially separated in time by a predetermined amount of time; and
  a display coupled to the buffer, wherein the display receives the older image and the newer image and presents the older and newer images to a viewer in a binocular format that enables the viewer to see a three-dimensional image of the field-of-view;
  wherein the predetermined time delay is set relative to a selected interpupillary distance between the older image and the new image for the binocular format;
  wherein the buffer includes a first buffer portion that stores the images therein and a second buffer portion that stores the images therein also and wherein the predetermined amount of time is set according to a first predetermined time delay and a second predetermined time delay that are different from one another, and wherein the first predetermined time delay signals the first buffer portion to transmit an older image and the second predetermined time delay signals the second buffer portion to transmit a newer image therefrom; and
  a first image stabilizer coupled to the buffer, wherein the newer image is transmitted to the first image stabilizer; and
  a second image stabilizer coupled to the buffer, wherein the older image is transmitted to the second image stabilizer, and at least one of the first and second image stabilizers adjusts the orientation of either the older image or the newer image to correspond to the orientation of the other image;
  a gyroscope;
  a first gyroscope buffer and a second gyroscope buffer coupled to the gyroscope, wherein the first and second gyroscope buffers both receive from the gyroscope and store the same data characteristic of the orientation of the housing, the data corresponding in time to the generation of the images of the field-of-view;
  wherein the first and second gyroscope buffers and the first and second image stabilizers are included in or are connected to a processor, wherein the processor receives data from the first gyroscope buffer that corresponds in time to the capture of the newer image and receives data from the second gyroscope buffer that corresponds in time to the capture of the older image and determines any change in the data during the predetermined amount of time and transmits the change to one or more of the first and second image stabilizers;
  wherein at least one of the first and second image stabilizers receives the change in the data and adjusts the orientation of either the older image or the newer image; and thereafter sends the older image and the newer image, post-adjustment, to the display; and
  wherein the housing is connectable to a user or hand-holdable by the user to move with the user.

18. The device of claim 17, wherein the display comprises a first display and a second display oriented such that the first display is alignable with a right eye of the user and the second display is alignable with a left eye of the user.

19. A method for presenting two-dimensional images for visualization of a three-dimensional image, the method comprising:
  providing a three-dimensional imaging system comprising at least one buffer, at least one image stabilizer, a display or a recorder, an adjustable time signal, and an input controller adjustable by a user of the display or recorder;
  storing a plurality of sequential images of a field-of-view in the buffer, wherein the sequential images are temporally separated from one another by a preselected time period;
  transmitting from the buffer to the image stabilizer an older image and a newer image that are separated from one another by a predetermined time delay based upon the adjustable time signal;
  optionally, aligning the orientation of at least one of the older and newer images relative to the other to provide a binocular effect;
  setting the adjustable time signal to establish the predetermined time delay, wherein the predetermined time delay is set relative to a selected interpupillary distance between the older image and the new image for a binocular format;
  providing the input controller configured for the user to change the adjustable time signal to change the interpupillary distance thereby adjusting the sensation of three-dimensional depth perception;
  displaying or recording the older and newer images in the binocular format enabling a viewer thereof to see a three-dimensional image;
  capturing the plurality of sequential images using an image device mounted on a vehicle having a gyroscope, wherein the capturing occurs while the vehicle is moving; and
  storing the same data from the gyroscope in both a first gyroscope buffer and a second gyroscope buffer;
  wherein the aligning step includes:
  determining any change in the data from the gyroscope during the predetermined time delay; and
  adjusting the orientation of at least one of the older image and newer image relative to the other image to compensate for any change in the orientation of the vehicle.

20. The method of claim 19, further comprising: adjusting the lateral position of at least one of the older and newer images relative to the other image to align objects present in the images.

* * * * *